UNITED STATES PATENT OFFICE.

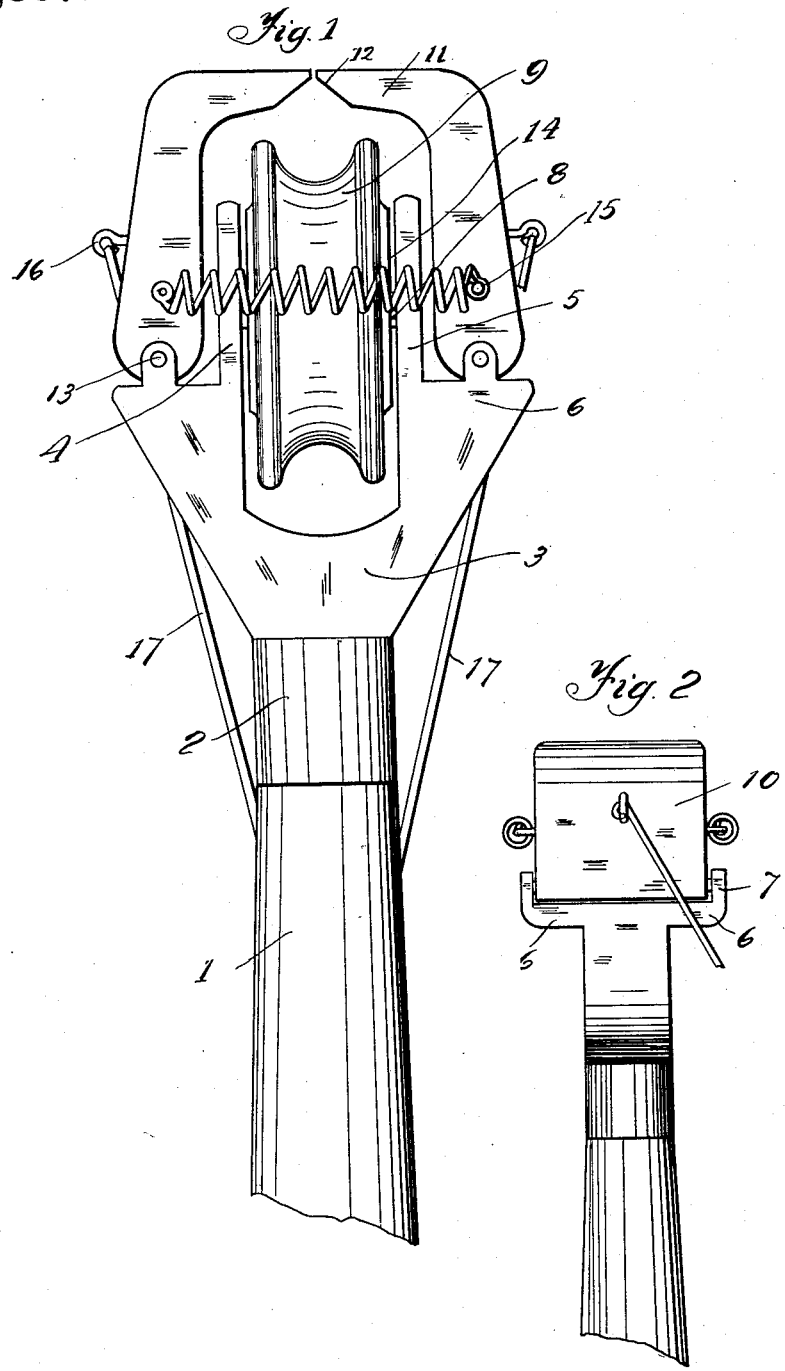

FRANK SCZAVNYICKI, OF BRIDGEPORT, CONNECTICUT.

TROLLEY.

1,159,807.  Specification of Letters Patent.  Patented Nov. 9, 1915.

Application filed August 31, 1914.  Serial No. 859,382.

*To all whom it may concern:*

Be it known that I, FRANK SCZAVNYICKI, a subject of the King of Hungary, residing at Bridgeport, in the county of Fairfield and State of Connecticut, have invented certain new and useful Improvements in Trolleys, of which the following is a specification, reference being had therein to the accompanying drawing.

This invention relates to trolleys and has for its object to provide a device of such class, with means in a manner as hereinafter set forth, to prevent the trolley from jumping the wire particularly when rounding curves.

Further objects of the invention are to provide a trolley which is simple in its construction and arrangement, strong, durable, efficient and convenient in its use, readily set up and comparatively inexpensive to manufacture.

With the foregoing and other objects in view the invention consists of a novel construction, combination and arrangement of parts as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—Figure 1 is a front elevation of a trolley in accordance with this invention. Fig. 2 is a side elevation.

Referring to the drawings in detail 1 denotes a trolley pole having a sleeve 2 mounted upon the upper end thereof and formed integral with the top of the sleeve 2 is the base 3 of a harp. The arms of a harp are indicated at 4, 5 and each of which has a pair of lateral extending oppositely disposed offsets 6 intermediate its ends. Each lateral offset 6 terminates in a vertically disposed apertured lug 7. Mounted in the upper portion of the arms 4, 5 is a shaft 8 and revolubly mounted upon said shaft is a trolley wheel 9.

Positioned between the lug 7 of each pair of oppositely disposed offsets is a guard member 10, of inverted L-shape in vertical section. The guard members are oppositely disposed with respect to each other and the horizontal portions 11 thereof project toward each other and have beveled free ends 12. Pins 13 carried by the lugs 7 engage the guard members 10 for pivotally connecting these latter with the harp. The guard members are connected together for the purpose of maintaining the horizontal portions 11 thereof, in close proximity through the medium of a pair of coil springs 14 and said springs 14 have their ends connected to the sides of the members 10 as at 15. Each of the members 10 has an outwardly projecting eye 16 and to each of said eyes is connected one of the arms of the yoke 17 and said yoke 17 is connected to the trolley rope, not shown.

When it is desired to position the trolley upon the wire the yoke 17 is pulled downward, under such conditions opening the guard members 10 and the trolley wheel 9 can then be positioned against the trolley wire. The pulling downwardly of the yoke 17 is had against the action of the spring 14 and when said yoke is released, the spring 14 will automatically shift the guard members toward each other whereby the horizontal portions of said guard members 10 will be arranged in close proximity and if the trolley wheel 9 should jump the wire the horizontal portions 11 will prevent the trolley from jumping the wire.

What I claim is:—

A trolley comprising a pole, a sleeve mounted thereon, a harp integral with said sleeve and having each of its arms provided intermediate its ends with a pair of oppositely disposed laterally extending offsets, each of said offsets terminating in a vertically disposed lug, a revoluble trolley wheel mounted in said harp, a pair of oppositely disposed inverted L-shaped guard members mounted upon said offsets and pivotally connected to said lugs, and coil springs connecting said members together whereby the horizontal portions of said members will be positioned in close proximity and extend over said wheel, eyes projecting outwardly from said members, a yoke attached to said eyes.

In testimony whereof I affix my signature in the presence of two witnesses.

FRANK SCZAVNYICKI.

Witnesses:
LAGOS KING,
LOUIS VARGES.

Copies of this patent may be obtained for five cents each, by addressing the "Commissioner of Patents, Washington, D. C."